Figure 1:
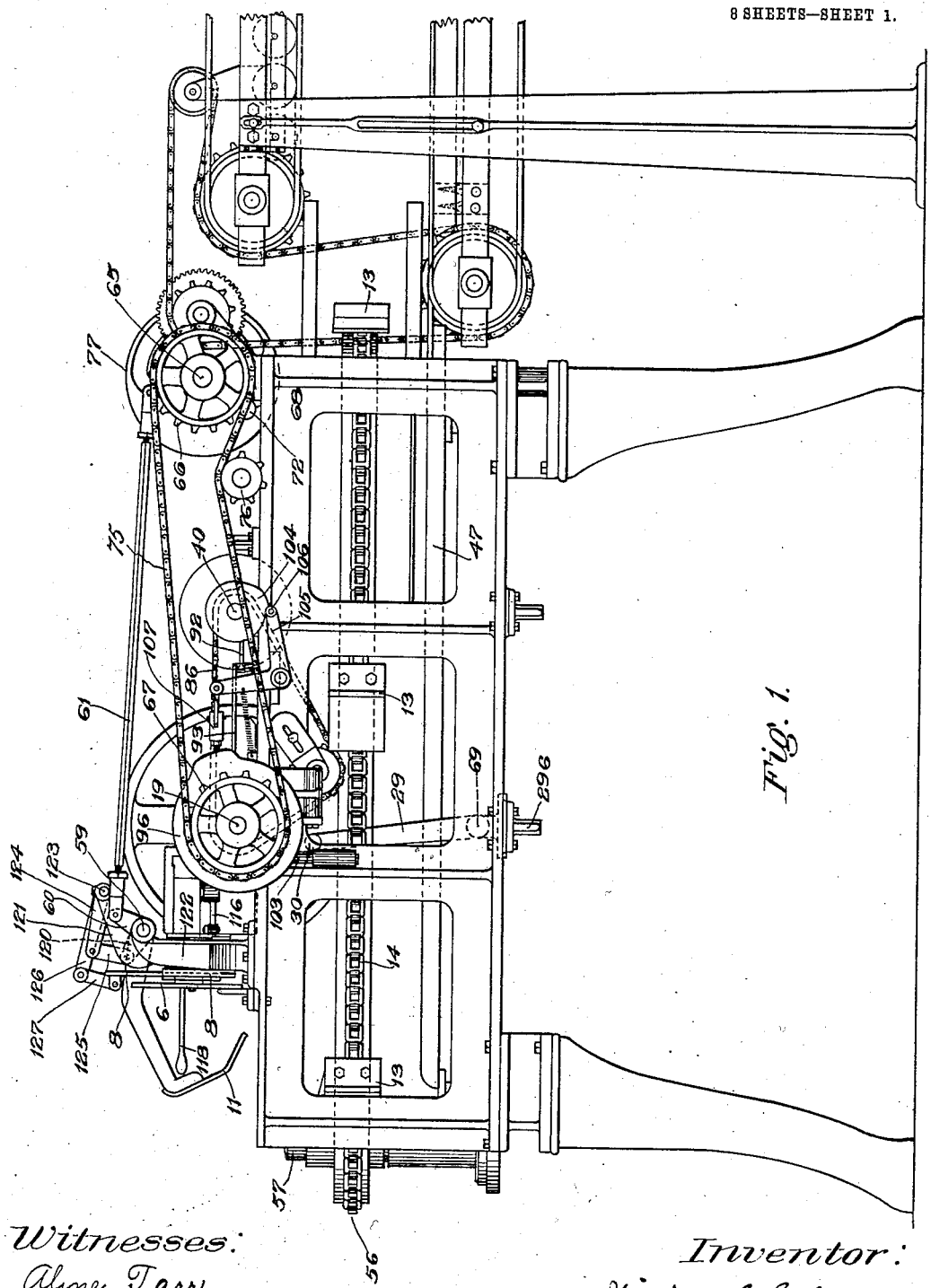

W. S. SCALES.
CARTON CLOSING AND SEALING MECHANISM.
APPLICATION FILED JUNE 8, 1908.

930,090.

Patented Aug. 3, 1909.
8 SHEETS—SHEET 2.

Witnesses:
Alvie Tarr
John H. Parker

Inventor:
William S. Scales
by Macleod, Calver, Copeland & Dike
attorneys

W. S. SCALES.
CARTON CLOSING AND SEALING MECHANISM.
APPLICATION FILED JUNE 8, 1908.

930,090.

Patented Aug. 3, 1909.
8 SHEETS—SHEET 5.

Witnesses:
Aline Tarr
John H. Parker

Inventor:
William S. Scales
by Macleod, Calver, Copeland & Dike
attorneys.

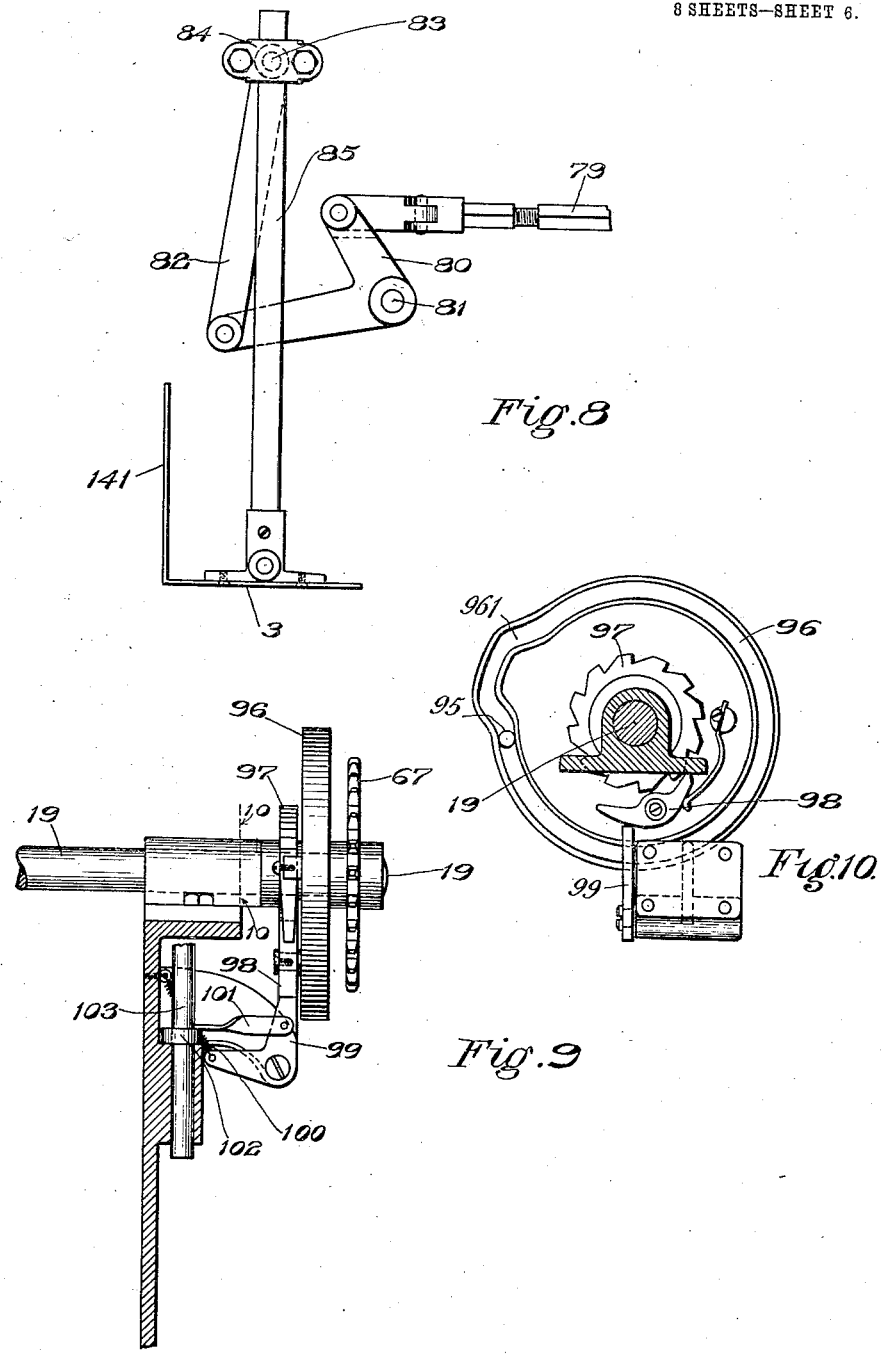

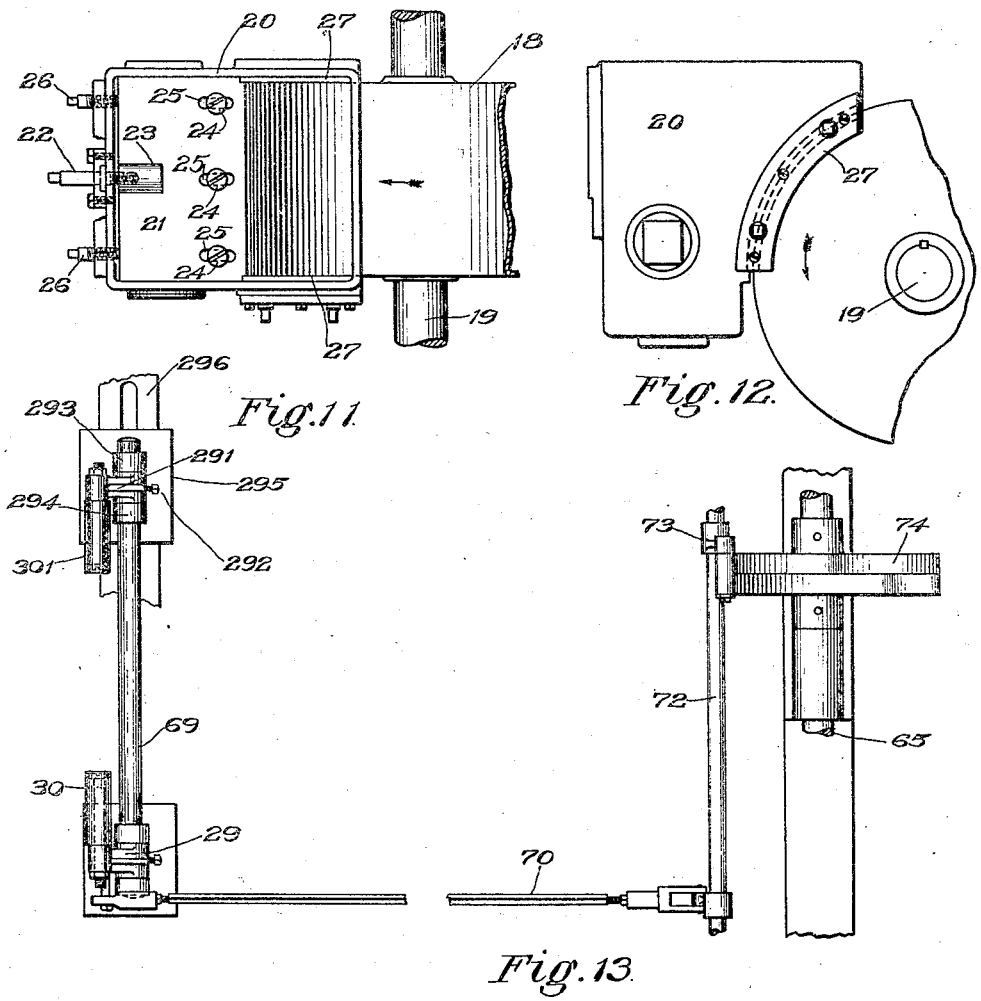

W. S. SCALES.
CARTON CLOSING AND SEALING MECHANISM.
APPLICATION FILED JUNE 8, 1908.
930,090.
Patented Aug. 3, 1909.
8 SHEETS—SHEET 8.
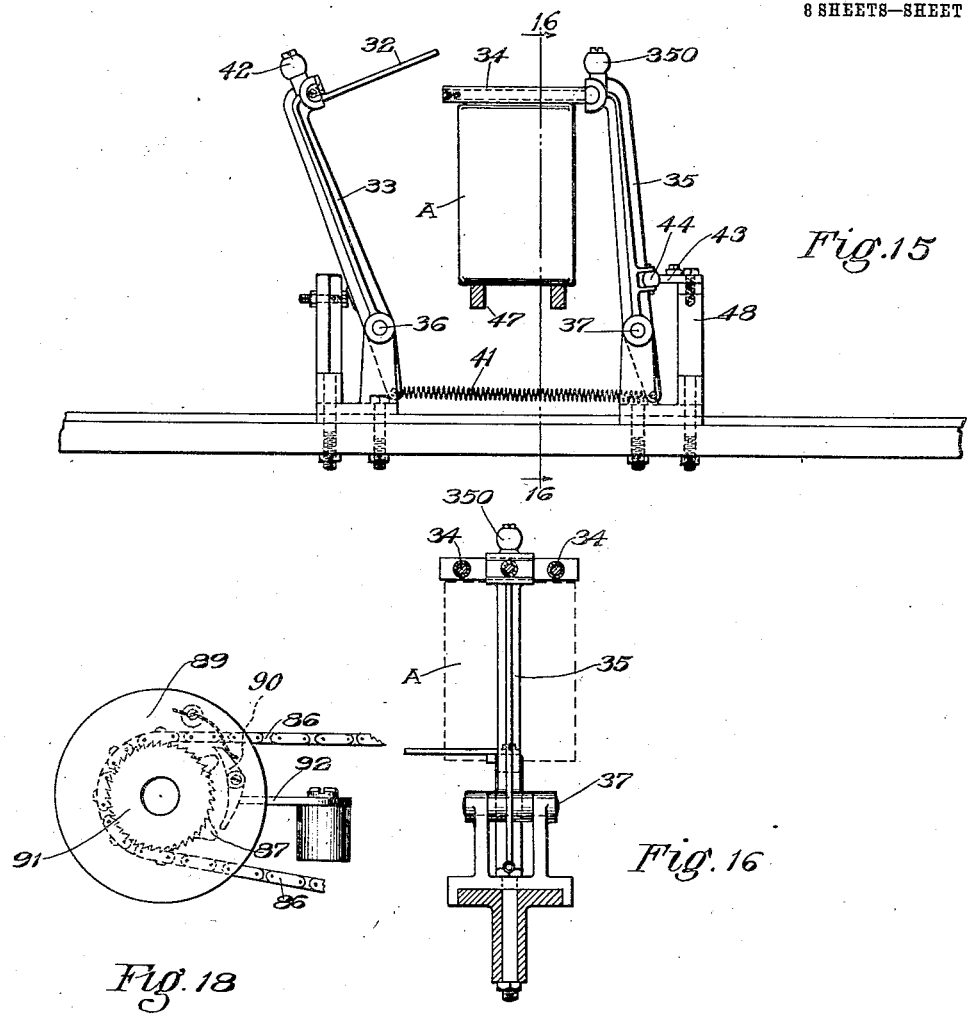
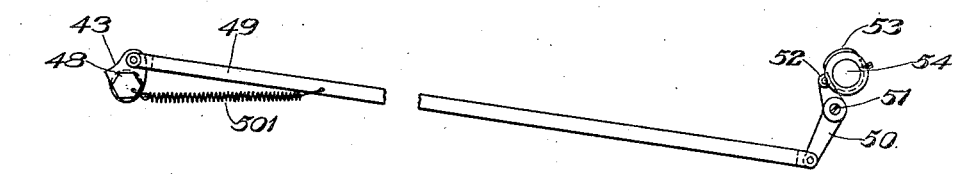
Witnesses:
Aline Tarr
John H. Parker
Inventor:
William S. Scales
by Macleod, Calver, Copeland & Dike
attorneys

UNITED STATES PATENT OFFICE.

WILLIAM S. SCALES, OF MEDFORD, MASSACHUSETTS, ASSIGNOR TO PNEUMATIC SCALE CORPORATION LIMITED, OF QUINCY, MASSACHUSETTS, A CORPORATION OF MAINE.

CARTON CLOSING AND SEALING MECHANISM.

No. 930,090.   Specification of Letters Patent.   Patented Aug. 3, 1909.

Application filed June 8, 1908. Serial No. 437,344.

*To all whom it may concern:*

Be it known that I, WILLIAM S. SCALES, citizen of the United States, residing at Medford, in the county of Middlesex and State of Massachusetts, have invented a certain new and useful Improvement in Carton Closing and Sealing Mechanism, of which the following is a specification, reference being had therein to the accompanying drawings.

The object of this invention is to provide mechanism for gluing and folding the flaps which close the upper ends of cartons which have been previously filled. The mechanism may be used in combination with the carton filling mechanism or may be used independently thereof as desired. It is especially intended, however, to be used in connection with a weighing or package filling machine in which, after the package or carton has been filled by the filling machine, the carton will be automatically transferred to the mechanism for gluing and folding the flaps which close the upper end of the carton, mechanism being provided to carry the packages automatically through the gluing and sealing mechanism and transferring them after they have passed through the sealing mechanism.

The cartons, as usually constructed, have four flaps for closing each end of the carton; namely, two side flaps as they are termed and two end flaps. The flaps which close the bottom are folded and sealed before the carton is filled. The flaps which are intended to close the top of the carton are usually left extended upward while the carton is being filled, and the cartons are transferred to the sealing mechanism while the flaps remain in this upwardly extended position.

The sealing mechanism of the present invention comprises means for opening out the side flaps of the carton to a horizontal position, means for folding the two end flaps, means for moving the carton along under gluing mechanism where the two side flaps are glued, then mechanism which folds first one side flap and then the other side flap, and means for then moving the carton under mechanism which presses upon the folded flaps to hold them for a period until the glue becomes set, and finally transferring the packages to some place of delivery.

The invention will be fully understood from the following description taken in connection with the accompanying drawings, and the novel features thereof are pointed out and clearly defined in the claims at the close of the specification.

Figure 2:
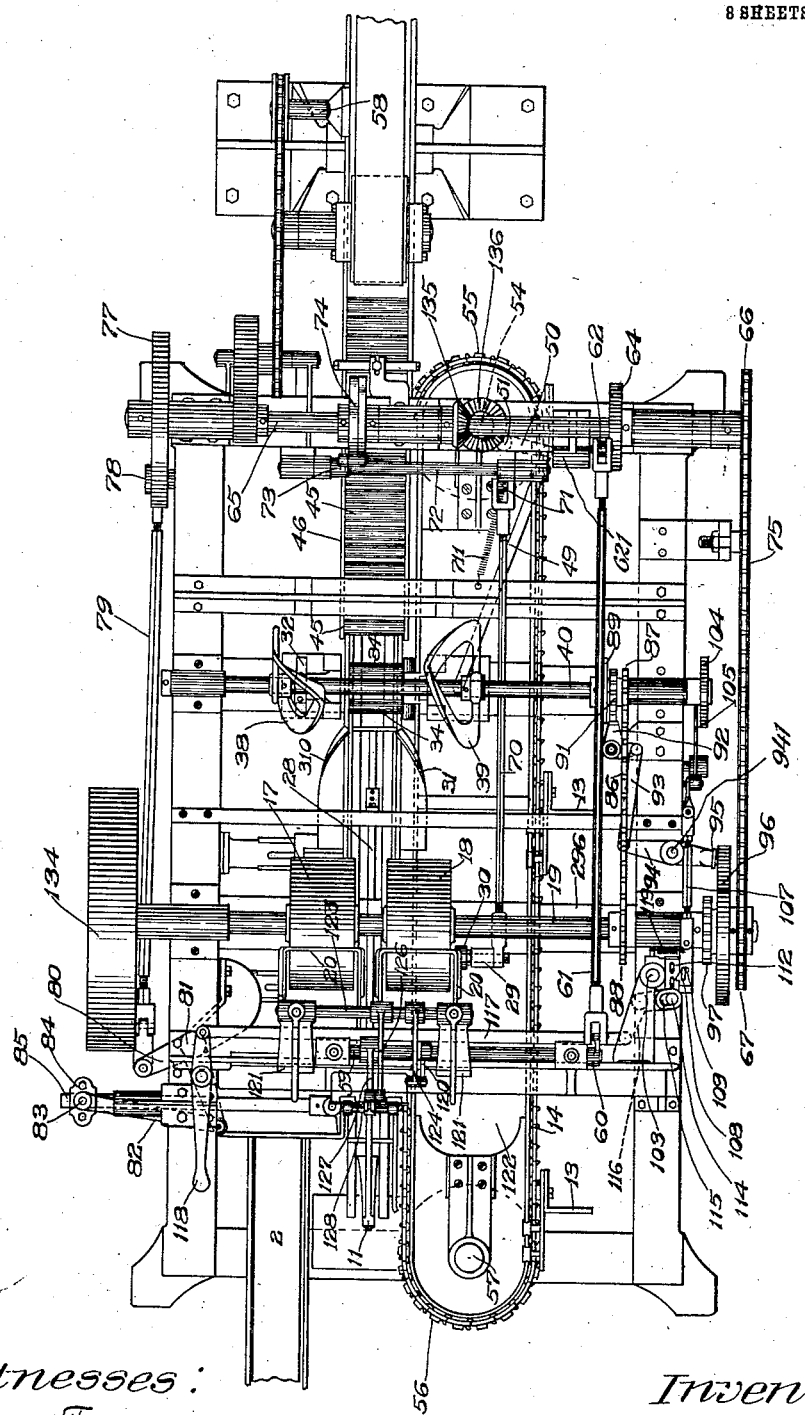
Figure 3:
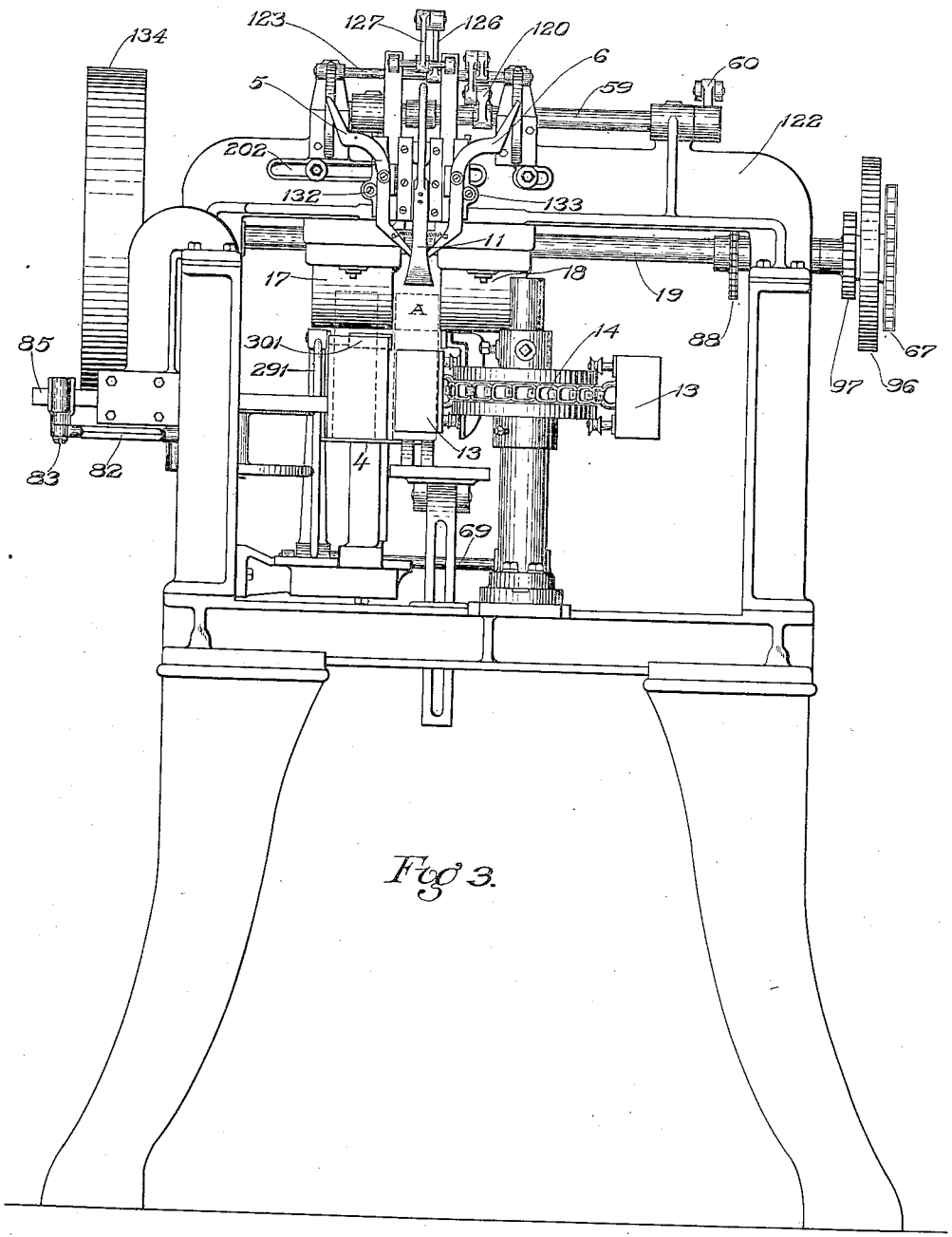
Figure 4:
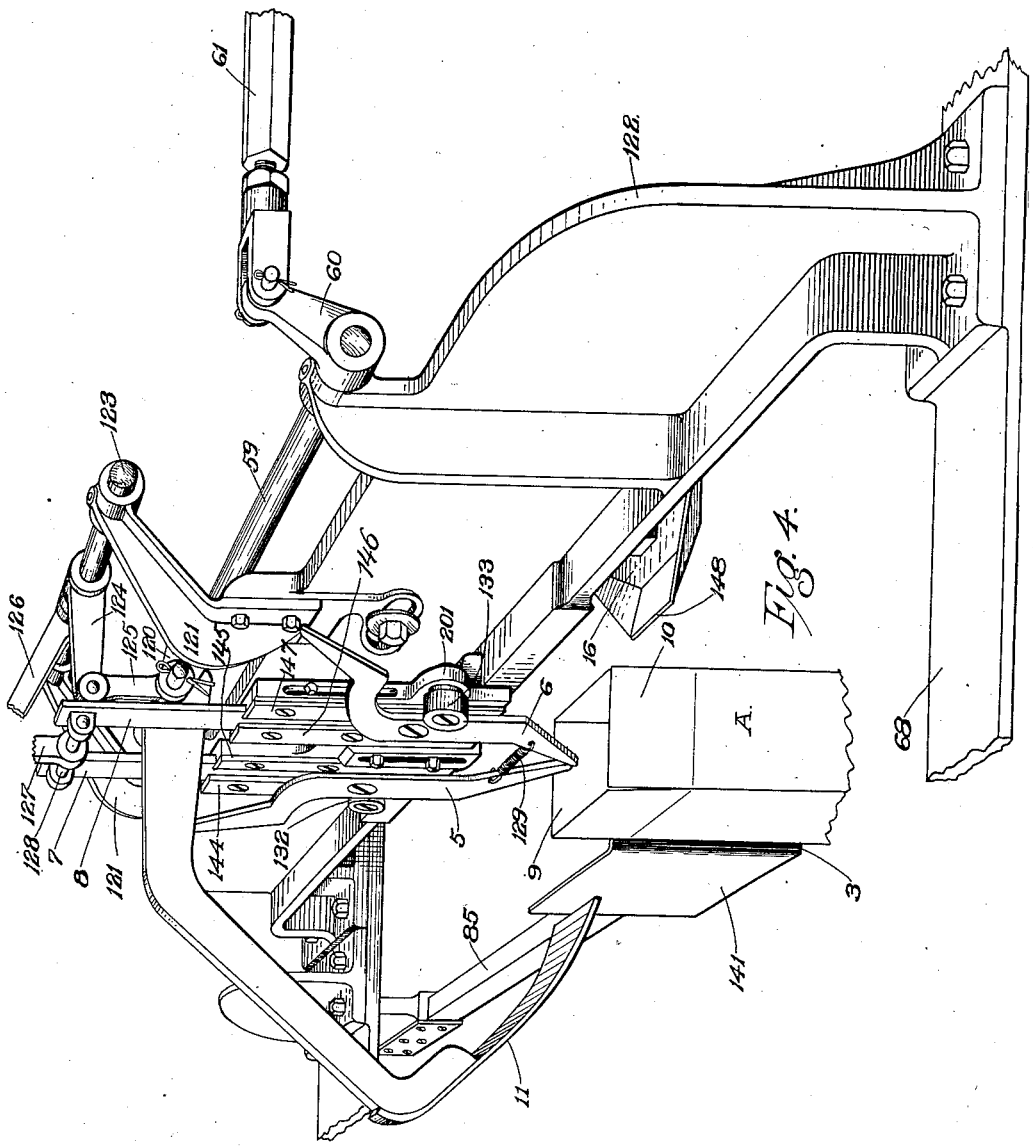
Figure 5:
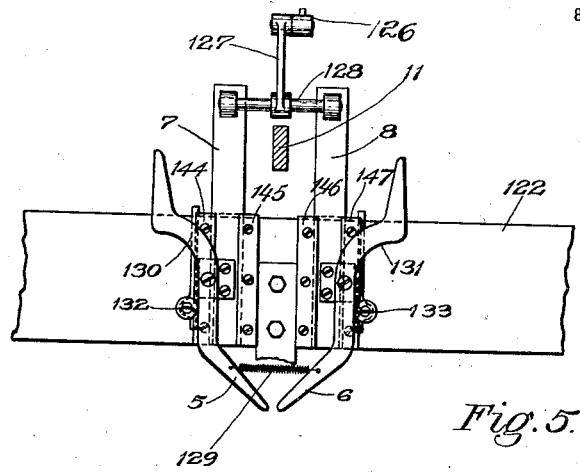
Figure 6:
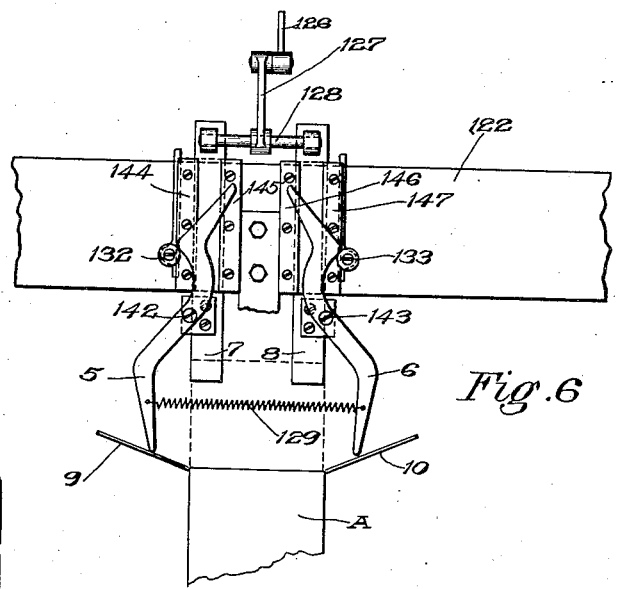
Figure 7:
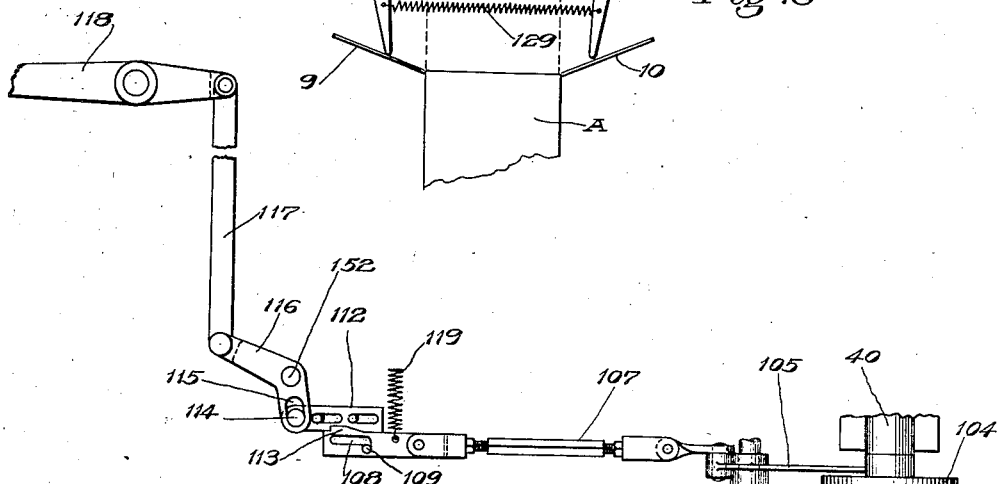

In the drawings,—Figure 1 is a side elevation on the right side as viewed from the front. Fig. 2 is a plan view. Fig. 3 is a front elevation. Fig. 4 is a perspective of a portion of the front of the machine. Fig. 5 is an elevation of the spreading-fingers closed. Fig. 6 is an elevation of the spreading-fingers opened and spreading the two side flaps of a carton. Fig. 7 is an enlarged detail of the controlling mechanism. Fig. 8 is an enlarged detail plan of the plunger-rod. Fig. 9 is a sectional elevation of the mechanism for controlling the side flap folding cams. Fig. 10 is a section on line 10—10 of Fig. 9. Fig. 11 is a plan view of the glue-pot. Fig. 12 is a side elevation of the glue-pot and part of the glue roll. Fig. 13 is an enlarged detail plan of the side-flap pressure rollers and mechanism for moving them. Fig. 14 is a perspective view of the flap spreader which folds the forward flap and holds down the two side-flaps. Fig. 15 is an elevation of the side-flap throwing fingers. Fig. 16 is a sectional elevation of one of the side-flap folding arms looking in the direction of the arrows 16, 16, in Fig. 15. Fig. 17 is an enlarged detail of the driving mechanism for locking the second side-flap folding arm after the flap is closed. Fig. 18 is a detail of the pawl carrier and stop on the side-flap folding cam-shaft.

In the drawings,—2 represents a belt which brings the cartons 1 from the filling mechanism or other point from which the filled cartons are supplied. The cartons are moved from the belt one by one at the proper time by a push plate 3 carried by a transversely reciprocable slide bar 85 which at each forward movement pushes one of the cartons onto the table 4 in position to be carried through the sealing mechanism. The push plate 3 has an arm 141 extending at right angles with the forward face of the push plate which serves as a guard and extends transversely of the belt 2 to hold back all advancing cartons except the one which is being pushed forward by the push plate. The mechanism for actuating the slide bar 85 will be described more fully hereinafter.

Mounted in suitable guides are two vertically reciprocating slides 7, 8, to which are pivoted respectively at 142 and 143 the spreader fingers 5, 6, for spreading the two side flaps 9, 10. The slide 7 moves in guide ways 144, 145, and the slide 8 moves in guide ways 146, 147, see Figs. 4, 5 and 6. The two slides 7, 8, are connected at their upper ends by the cross-piece 128, so that they will move together as will be hereinafter described.

The mechanism for vertically reciprocating the slides 7, 8, which carry the flap opening fingers 5, 6, is as follows: Mounted on the rocker shaft 59 is a lever 120. Brackets 121, which are attached to the standard 122, carry a rocker shaft 123 upon which is mounted a lever 124. This lever 124 is connected with lever 120 by a link 125 by which it is actuated. Mounted also upon shaft 123 is a lever 126 to the outer end of which is connected a link 127 which is also attached to the cross-piece 128 by means of which the slides 7, 8, are vertically reciprocated.

As shown in Fig. 5 the slides 7, 8, are in their elevated position holding the fingers 5, 6, in a closed position above the extended flaps of the carton. They are normally held in this closed position by a spring 129.

The cartons are moved along the table 4 and through the various operating mechanisms for gluing and sealing the flaps by fingers 13 carried by a horizontally moving endless chain 14. The push plate 3 moves a carton into position in front of one of the carrier-fingers 13, approximately centrally beneath the flap opening fingers 5, 6. The push plate 3 always brings the carton up against one of the carrier fingers 13 which will be a fixed point. If a carton of greater thickness is to be used, the forward movement of the push plate 3 should be shortened enough to make up for the increased thickness of the carton. In order to vary the stopping and starting point of the push plate 3, the slide rod 85 which carries the push plate is adjustable longitudinally in the block 84. It is important that the center line between the spreading fingers 5, 6, should always be in line with the middle of the carton and for that reason the supports for the spreader fingers 5, 6, are laterally adjustable and for the same reason the guide rail which holds the carton against the carrier finger 13 should also be laterally adjustable. For the same reason also one of the glue rolls and one of the pressure rolls which holds one of the spread flaps against the glue roll on the opposite side from the carrier finger hereinafter described should also be adjustable. The chain 14 and the carrier-fingers 13 move intermittently as will be hereinafter described. The endless chain 14 passes around sprocket wheels 55, 56, and the carrier-fingers 13 are preferably spaced such a distance apart that one of the carrier-fingers will be brought into position to engage one of the cartons delivered from the belt 2 by the push plate 3 at each cycle of movement.

The slides 7, 8, will descend immediately after the carton is brought beneath the flap opening fingers 5, 6. Projecting from the support which carries the slides 7 and 8 are roll carriers 201 on which are mounted rollers 132, 133, which engage the outer sides respectively of the bent fingers 5, 6. As the slides 7, 8, descend, the curved faces 130, 131, respectively of the fingers 5, 6, engage with the rollers 132, 133, until they come to the upper end of the curve, thereby opening out the fingers as shown in Fig. 6. The fingers will enter between the upwardly extending side flaps of the carton during the early part of the descent of the slides, and as the fingers open, they will spread the side flaps 9, 10, of the carton A. After the side flaps are opened by the fingers 5, 6, the bent finger 11 rocks down in a vertical plane and strikes the rear flap 12 from the rear and closes it. This folding finger 11 is mounted on the horizontal rocker shaft 59 which carries the lever 120 previously described. Fixedly mounted on rocker shaft 59 is a vertical rocker arm 60 connected by a rod 61 with a vertical rocker shaft 62 pivoted in the bearing block 621 and having a pin not shown which engages a track-cam 64 on a horizontal transverse shaft 65 at the rear end of the machine, said shaft 65 carrying the sprocket wheel 66. The lower end of said rocker arm 62 is pivoted to the frame 68. See Figs. 1, 2, 3 and 9.

Mounted above the table 4 and just above the path of the upper end of the moving carton is a flap folder plate 16 having the forward end 148 somewhat narrowed and inclined upward as shown in Fig. 14, so that as the carton advances, the inclined end 148 will engage the advancing end flap 15 of the carton and fold it flat over the top of the carton. The flaring sides 149 of the plate will engage the already partially spread side flaps 9, 10, of the carton and spread them farther open until the flat bottom of the plate 16 engages the side flaps and spreads them out into a full horizontal position. The plate 16 is so positioned that the inclined end 148 will engage the advancing end flap 15 and partially fold it down on top of the folded rear flap 12 before the finger 11 leaves the rear flap 12, and the continued folding of the advance end flap 15 will hold down the already folded rear flap 12. The folder plate 16 is preferably adjustably secured to the frame so that it may be adjusted to the right position. After passing beneath the folder plate 16 the carton passes beneath the two glue rolls 17, 18, which apply glue to the upper faces of the side flaps 9, 10; that is, to those faces of the side flaps which are uppermost while in their horizontal extended position, but which will be the under side when the flaps are folded inward.

Extending from the folder plate 16 rearwardly between the glue rolls 17, 18, and just below them is a flat horizontal retaining bar 28 which engages the upper sides of the front and rear flaps 12, 15, to hold them closed after the carton passes out from beneath the plate 16 and while the side flaps of the carton are passing beneath the glue rolls.

The glue rolls 17, 18, are mounted on a shaft 19, each roll dipping into one of the glue pots 20 during a part of its rotation. In the bottom of each glue pot 20 is a scraper 21, whose edge is parallel with the periphery of the glue roll and is adjustable relative to the glue roll so as to regulate the thickness of the film of glue engaged by the glue roll. This adjustment is accomplished by means of an adjusting screw 22 which is mounted in the side of the glue pot and engages a lug 23 on the scraper 21. The scraper is secured to the bottom of the glue pot by screws 24 which pass through slots 25 in the scraper 21. Stop screws 26 limit the movement of the scraper. In use the stop screws 26 are so adjusted that the scraper may be set at the right distance away from the periphery of the glue roll to allow a film of the desired thickness to be taken up by the glue roll while the machine is in operation. Then when the machine is stopped, the screws 24 will be loosened and the scraper will be moved up into contact with the periphery of the glue roll to prevent leakage of the glue while the machine is at rest. Then when the machine is started again, the scraper should be moved back against the stop screws. By this method of adjustment the scraper can be moved out to a fixed distance from the glue roll every time that it is started up again after a time of cessation without the necessity of making a nice adjustment at each time. But whenever it is desired to vary the thickness of the film, a new adjustment can be made. An adjustable bushing 27 is secured to the glue pot at each end of the glue roll to prevent leakage of the glue at the ends of the rolls.

Two vertical rocker arms 29, 291 are provided respectively with rollers 30, 301 at their upper ends which respectively engage the under side of the extended side flaps 9, 10, to hold them in engagement with the glue rolls. After passing the glue rolls and before the forward and rear flaps 15 and 12 respectively pass out from under the horizontal retaining bar 28, the side flaps 9, 10, pass between two curved guides 31, 310, which fold or partially fold the two side flaps inward. Then one of the side flaps is engaged laterally by a finger 32 on the end of a vertical rocker arm 33 pivoted at 36 to complete the folding of that side flap which is engaged by it; then the other side flap is engaged by the ends of two laterally extending rollers 34, 341, on the upper end of a vertical rocker arm 35 pivoted at 37 which moves laterally inward to close the said side flap engaged by them.

To provide for cartons of varying sizes, the glue roll 17 is adjustable laterally on the shaft 19, and its glue pot 20 is also adjustable by means of the slot 202 in the frame.

The rocker arms 33 and 35 which carry the side flap folders are actuated respectively by cams 38, 39, on a horizontal transverse shaft 40 which extends crosswise above the path of movement of the cartons. Both rocker arms are normally held by means of a spring 41 in a position to retain the fingers 32 and 34 out of the path of the carton. In Fig. 12 the lever 3 is shown in a position where the finger 32 is out of the path of the carton and rocker arm 35 is in position where the rollers 34 are in position to engage the flaps of the carton.

Carried on the upper end of the rocker arm 33 is a roller 42 which is engaged by the cam 38 to actuate said rocker arm, and rocker arm 35 carries a roller 350 which is engaged by the cam 39 to actuate said rocker arm 35. The first rocker arm 33 is thrown back by the spring 41 as soon as the cam 38 passes from the roller 42. The rocker arm 35, however, which folds the second side flap is locked against retraction for a time, after the cam 39 passes from roller 350, by a cam 43 which engages a roller 44 on the rocker arm 35. It remains locked until the carton has moved far enough for the last folded flap to be engaged by one of the pressure rollers 45 mounted in the horizontal frame 46 above the path of the cartons.

The lower end of the carton is supported on a horizontal track 47 on which it travels. Before the last closed flap passes entirely out from engagement with the folding rollers 34, the said flap will be engaged by one of the series of pressure rollers 45. The pressure rollers 45 are a series of parallel rollers, each extending transversely of the path of the carton just above the top of the carton, so as to engage the folded flap and are mounted in the frame 46 as already described.

The locking cam 43 is pivoted on top of a vertical post 48 and has a horizontal rocking movement. As soon as the carton passes out from under the folding rollers 34 and becomes engaged by the first of the pressure rollers 45, the locking cam 43 which engages with the roller 44 on rocker arm 35 will be turned sufficiently to allow the rocker arm 35 to be pulled back on its pivot by spring 41 and thereby retract the rollers 34 from the path of the carton.

The cam 43 is connected by a link or connecting rod 49 with a horizontal rocker arm 50 on a vertical post 51 at the rear end of the machine. This rocker arm 50 has one end connected with said connecting rod 49. The other end of said rocker arm carries a vertical roller 52, see Fig. 17, which is engaged by a horizontal rotary cam 53 on a vertical shaft 54 which carries one of the sprockets 55 which drives the chain carton-carrier 14, see Fig. 2. The roller 52 is retained in engagement with the cam 53 by a spring 501.

The pressure rollers 45 which engage the flaps after the flaps are all folded as above described are for the purpose of holding the flaps down for a period of time long enough for the glue to become sufficiently set to prevent the flaps from springing back. In the further movement after the cartons have passed out from beneath the pressure rollers, they are delivered onto a belt 58, see Fig. 2, or are otherwise removed from the machine.

The vertical rocker arms 29, 291, which carry the pressure rollers 30 and 301 which hold the side flaps against the glue rolls are both fixedly mounted on a horizontal shaft 69, see Figs. 1 and 13. One of these vertical rocker arms is connected by a rod 70 with a vertical rocker arm 71 at the rear end of the machine, Figs. 1, 2 and 10, said rear rocker arm 71 being fixedly mounted on a horizontal rocker shaft 72. Said rocker shaft 72 carries a rocker arm 73 fixed thereon having a horizontal stud with a roller engaged by a cam 74 on the driving shaft 65. The said cam 74 rocks the arm 73 and rocker shaft 72 to move the connecting rod 70 and forward rocker arm 29 to reciprocate the pressure rollers 30 which hold the flaps against the glue rolls. A spring 711, Fig. 2, retains the roller on arm 73 against the cam 74.
The arm 291 carrying the roll 301 is made fast to the shaft 69, but may be adjusted thereon to vary the distance between the rolls 30 and 301 to correspond with the adjustment of the glue rolls and adapt them to cartons of different thicknesses. The arm 291 is held in its adjusted position by set screw. The arm 291 is fast to the shaft 69 between the ears 293, 294 on the bearing block 295 which is adjustable on the cross piece 296 of the frame.

The glue roll shaft 19 carries a sprocket 67 which is connected by means of a chain 75 with the sprocket 66 on shaft 65, the shaft 19 being continuously rotated by the pulley 134.
This chain 75 is given tension by an idler sprocket 76, see Fig. 1.

On the other end of the driving shaft 65 from that which carries the sprocket 66 is a track-cam wheel 77 having a cam groove which is engaged by a stud on a vertical rocker arm 78 pivoted between its ends to the frame, Figs. 2 and 8. The lower end of the rocker arm 78 is connected by a horizontal rod 79 with a horizontal bell crank rocker arm 80 mounted on a vertical pivot 81 on the frame. The other arm of said bell crank rocker is pivoted to one end of a horizontal rod 82 whose other end is connected with the lower end of a vertical shaft or stud 83 which extends downwardly from a block 84 adjustably fixed on the transverse horizontal slide rod 85 which actuates the push plate 3.

The shaft 40 which carries the cams 38 and 39 which actuate the mechanism for folding the two side flaps is mounted in bearings on the frame of the machine and is driven by a sprocket chain 86 which connects a sprocket wheel 87 loose on said shaft 40 with a sprocket wheel 88 fast on the glue roll shaft 19. The cam shaft 40 moves intermittently. The mechanism for causing the intermittent movement is as follows: A disk 89 fast on the shaft 40 carries a spring pressed pawl 90 adapted to engage with a ratchet 91 loose on the shaft, see Figs. 2 and 18. The ratchet 91 is fast to the sprocket 87 and moves continuously therewith. When the pawl 90 is engaged with the ratchet 91, the cam shaft 40 will be rotated through the chain connection 86. Once in each revolution of the shaft 40 the pawl 90 is tripped by a dog or horizontal bell crank lever 92, one arm of which is pivoted to one end of a connecting rod 93, Fig. 2, the other end of the connecting rod 93 being pivoted to one end of a horizontal lever 94, the other end of said lever 94 carrying a roller 95 which engages with a cam groove in the cam 96 loosely mounted on the glue roll shaft 19.

Mechanism is provided to make the cam 96 rotate intermittently. When it does rotate, it actuates the dog 92 to release the pawl 90 on the cam shaft 40 above described. The mechanism for giving intermittent movement to the cam 96 is as follows: A ratchet 97 is fast on the glue roll shaft 19. On the face of cam 96 is carried a spring pressed pawl 98, Figs. 2 and 10, which is adapted to engage with the ratchet 97. When it does so engage with the ratchet, the cam 96 will rotate. The pawl 98 is tripped once at each rotation of the shaft by a vertical bell crank stop 99. The bell crank stop 99 is normally held in engaging position in the path of the pawl by a spring 100. To pull the stop 99 out of the path of the pawl 98 a horizontal link 101 is pivoted at one end to the upper arm of the bell crank stop 99, the other end of the link being pivoted to one end of a horizontal arm or lever 102 fixed to a vertical rocker shaft 103. Said rocker shaft 103 is actuated through various intermediate mechanisms by a cam 104 on the horizontal shaft 40 which carries the flap folding cams 38, 39, Figs. 2 and 7.

The intermediate mechanism just above mentioned is as follows: A bell crank 105 has one arm with a roller 106 engaged by the cam 104 on the shaft 40. See Figs. 1, 2 and 7. The other arm of said bell crank 105 is pivoted to one end of a connecting rod 107 whose forward end is formed with a right-angled slot 108, Figs. 2 and 7. The said slot 108 is engaged by a vertical pin 109 extending up from an arm on the vertical rocker shaft 103, the said pin normally engaging with the transverse portion of said slot. The rearward movement of the slotted connecting rod 107 through the action of the cam 104 on the cam shaft 40 turns the vertical rocker shaft 103 in a direction to move the bell crank stop 99 out of the path of the pawl 98 carried by the cam 96 so that the pawl 98 is allowed to engage with the ratchet 97, and the cam 96 and sprocket 67 carried thereby will rotate. The spring 100 connected with the bell crank stop 99 throws the said stop back into engaging position as soon as the pawl 98 passes it so as to stop the cam 96 at the end of the revolution.

It is desirable to provide means for stopping the machine at a predetermined point in the cycle of operation, and this is done by mechanism for controlling the bell crank stop 99 to prevent it from being disengaged from the pawl. The mechanism for doing this is as follows: The connecting rod 107, in which is the right-angled slot 108, may be thrown to bring the longitudinal portion of the slot into engagement with the vertical pin 109 on the arm which projects from the vertical rocker shaft 103 previously mentioned. This is accomplished by means of a slotted plate 112, Figs. 2 and 7, having a notch in its side which normally receives a lateral projection 113 having a horizontally slanting face on the side of the slotted end portion of connecting rod 107. When this notched plate 112 moves longitudinally, the inclined edge of the notch acts as a cam upon the inclined projection 113 of the rod 107 to move the rod 107 laterally, thereby bringing the longitudinal portion of the slot 108 into engagement with the pin 109 so that if the connecting rod 107 moves forward and back while the pin 109 is in engagement with said longitudinal portion of the slot 108, the longitudinal movement of the rod 107 will not communicate movement to the stud 109 and therefore will give no movement to the rocker shaft 103. The cam notched plate 112 is provided with a stud 114 projecting upwardly which engages with a slot 115 in a horizontal rocker arm 116 pivoted at 152 and is actuated by a horizontal connecting rod 117 operated by a hand lever 118, Figs. 1, 2 and 7. When the hand lever 118 is thrown one way it causes the notched plate 112 to throw the slotted rod 107 and bring the longitudinal arm of the slot 108 into engagement with the stud 109, and when thrown the other way, it allows a spring 119 to throw the slotted rod 107 back into position where the transverse portion of the slot engages the stud 109 and the cam projection 113 will fit into the notch of the plate 112 as shown in Fig. 7.

The operation of the machine is as follows: The belt driven pulley 134 drives the shaft 19 and with it the glue rolls 17, 18, and the ratchet 97 which revolves continuously with it. Upon the engagement of the pawl 98 with the ratchet 97 the sprocket 67 is caused to rotate, thereby giving rotation to the sprocket 66 with which it is connected by chain 75 and giving rotation also to the shaft 65 on which sprocket 66 is mounted. On said shaft 65 is secured a miter gear 135 which engages with a miter gear 136 mounted upon a vertical shaft 54 on which is mounted a sprocket 55, thereby driving the carrier chain 14 which runs upon said sprocket 55 and sprocket 56 to move the cartons. In operation a carton is carried by the push plate 3 to a position in front of one of the carrier fingers 13 which carries it to its position beneath the flap opening fingers 5, 6. Then the slide plates 7, 8, descend, causing the fingers 5, 6, to enter between the upwardly extended side flaps; and as the slides 7, 8, continue to descend, the fingers 5, 6, are spread apart, opening out the side flaps, and while this is being done, the finger 11 will rock down and fold the rear end flap. Then the carton will be carried forward beneath the plate 16 whose upwardly inclined end 148 engages and folds the advancing end flap down upon the rear end flap before the finger 11 is retracted and the slide plates 7, 8, and fingers 5, 6, will be retracted. Then, as the carton continues to advance, the finger 11 is raised, and the inclined sides 149 of the plate 16 engage the partially extended side flaps and further extend them. Then, the carton passing under the horizontal portion of the plate 16, the side flaps will be fully extended to a horizontal position, and the folded end flaps are held folded. Thence, the carton continues under the retaining bar 28 and beneath the glue rolls 17, 18, which glue the extended side flaps. Thence the carton passes between the guides 31, 310, which partially fold the two side flaps. Thence it passes between the two rocker arms 33, 35, which are actuated successively to cause the finger 32 to complete the folding of one of the side flaps. Then the rollers 34 complete the folding of the other side flap while the finger 32 is moved away from the top of the carton and the rocker arm 35 is locked by the cam 43 to hold the rollers 34 on top of the carton. The carton is then carried from beneath the retaining rollers 34 under the pressure rollers 45 and delivered to the transfer belt 58. Once in each revolution of the cam 96 carried by shaft 19 the portion of the cam groove in the toe 961 of the cam (see Fig. 10) traverses the roller 95 carried by the lever 94. When the toe 961 traverses the roller 95, the lever 94 on which the roller is mounted is caused to turn on its pivot 941 (see Fig. 2), thereby actuating the connecting rod 93 and turning the bell crank lever or dog 92 to release the dog from engagement with the pawl 90, so that the spring which engages pawl 90 will cause said pawl 90 to engage ratchet 91 and thereby cause the shaft 40 to revolve until the pawl is again engaged by the dog 92 which immediately after the passage of the toe 961 of cam 96 will have been turned by its spring back into engaging position. The cam 96 will in the meantime have come to a standstill by reason of the stop 99 engaging the pawl 98 and tripping it from ratchet 97. Before the shaft 40 completes its revolution, the cam 104 carried thereon will have moved the bell crank 105, and connecting rod 107, which by means of the right-angled slot 108 engaged by pin 109 on the arm of upright rocker shaft 103 will turn the rocker shaft 103, thereby actuating the lever 102 and link 101 to move the stop 99 out of engagement with pawl 98, thus permitting pawl 98 to respond to its spring and engage with ratchet 97. This will cause cam 96 to revolve which at the proper point in its rotation will again actuate the lever 94 and connecting rod 93 to release the dog 92 from pawl 90 and allow the shaft 40 to revolve. At each rotation of the sprockets 67, 66, one cycle of operation will be performed. The cycles of operation will continue without interruption, one after another, while the power is on until stopped by the operator by means of the lever 118 as previously described, and the operator can start it again by throwing the lever 118 back again.

What I claim is:

1. In a machine for closing and sealing the top closing flaps of filled cartons, two spreader fingers, a vertically reciprocable support to which said spreader fingers are pivoted, means for moving cartons successively and centering them in a position beneath the middle point between the lower ends of said fingers, means for vertically reciprocating the support for said fingers whereby the ends of said fingers are entered between two opposite flaps of the carton and means for spreading said fingers to engage and spread said flaps.

2. In a machine for closing and sealing the top closing flaps of filled cartons, two spreader fingers, a vertically reciprocable support to which said spreader fingers are pivoted, means for moving cartons successively and centering them in a position beneath the middle point between the lower ends of said fingers, means for vertically reciprocating the support for said fingers whereby the ends of said fingers are entered between two opposite flaps of the carton, means for spreading said fingers to engage and spread said flaps and means for laterally adjusting the pivot support for said fingers so as to vary the position of the center line between the fingers.

3. In a machine for closing and sealing the top closing flaps of filled cartons, two spreader fingers, a vertically reciprocable support to which said spreader fingers are pivoted, means for moving cartons successively and centering them in a position beneath the middle point between the lower ends of said fingers, means for vertically reciprocating the support for said fingers whereby the ends of said fingers are entered between two opposite flaps of the carton, means for spreading said fingers to engage and spread said flaps, a carrier finger which engages one side of the carton, and a laterally adjustable guide which engages the opposite side of the carton to accommodate cartons of different thicknesses.

4. In a machine for closing and sealing the top closing flaps of filled cartons, two spreader fingers, a vertically reciprocable support to which said spreader fingers are pivoted, means for moving cartons successively and centering them in a position beneath the middle point between the lower ends of said fingers, means for vertically reciprocating the support for said fingers whereby the ends of said fingers are entered between two opposite flaps of the carton, means for spreading said fingers to engage and spread said flaps, mechanism for folding the other flaps, two glue rolls which are adapted to glue the upper faces of the two spread flaps, two movable pressure rolls which are normally out of engagement with the glue rolls and which are adapted to be moved into position to engage the under faces of said spread flaps and press the upper faces of the flaps against the glue rolls, mechanism for moving the said pressure rolls, one of said glue rolls and its corresponding pressure roll being adjustable laterally to vary the distance between the glue rolls and to vary the distance between the pressure rolls to accommodate cartons of different thicknesses.

5. In a machine for closing and sealing the flaps of filled cartons, vertically reciprocable slides two flap opening fingers pivoted thereto whose lower ends are of less distance apart than the mouth of the carton, means for vertically reciprocating said slides, and means for spreading said fingers during the descent of said slides whereby they engage and spread the extended two opposite side flaps of the carton.

6. In a machine for closing and sealing the flaps of filled cartons, vertically reciprocable slides two flap spreading fingers pivoted thereto whose lower ends are adapted to enter between the extended side flaps of the carton, means for reciprocating said slides, means for spreading said fingers after they have entered between said extended side flaps of the carton and a laterally adjustable block in which said slides are mounted.

7. In a machine for closing and sealing the flaps of filled cartons, vertically reciprocable slides two flap spreading fingers pivoted thereto whose lower ends are adapted to enter between the extended side flaps of the carton, means for reciprocating said slides, means for spreading said fingers after they have entered between said extended side flaps of the carton, and means for laterally adjusting the support for the spreading fingers so as to vary laterally the central line between the fingers to accommodate cartons of different sizes.

8. In a machine for closing and sealing the flaps of filled cartons, vertically reciprocable slides two flap opening fingers pivoted thereto whose lower ends are adapted to enter between the extended flaps of the carton, means for reciprocating said slides, said fingers being formed with cam faces, and suitable stationary projections which are engaged by said cam faces during the descent of said slides, whereby said fingers are spread apart, thereby spreading two opposite flaps of the carton.

9. In a machine for closing and sealing the flaps of cartons, means for spreading two opposite flaps, two glue rolls which are adapted to glue the upper faces of the two spread flaps, two movable pressure rolls which are normally out of engagement with the glue rolls and which are adapted to be moved into position to engage the under faces of said spread flaps and press the upper faces of the flaps against the glue rolls, mechanism for moving the said pressure rolls, and means for laterally adjusting one of said glue rolls and its corresponding pressure roll to vary the distance between the glue rolls and to vary the distance between the pressure rolls to accommodate cartons of different thicknesses.

10. In a machine for closing and sealing the flaps of cartons, a glue pot having a slotted bottom, a revoluble glue roll which in its rotation dips into the glue pot and projects into said slotted opening, a movable scraper which may be moved away from said glue roll to permit a film of glue to be taken up by the roll or to be moved into contact with the roll to prevent passage of the glue as desired, stops with which the scraper engages to limit its opening movement and thereby insure a uniform thickness of film each time it is opened without readjustment of stops and means for adjusting said stops to vary the predetermined range of movement.

11. In a machine for closing and sealing the flaps of filled cartons, mechanism for moving the filled cartons, mechanism for spreading two opposite side flaps, rotatable glue rolls for gluing the upper faces of the spread side flaps, and movable pressure rolls which engage the under sides of said side flaps and press them against the said glue rolls and means for moving the pressure rolls into and out of engaging position.

12. In a machine for closing and sealing the flaps of cartons, mechanism for spreading two opposite flaps, two rotatable glue rolls for gluing said opposite flaps, two movable pressure rolls which are normally out of engagement with the glue rolls and which are adapted to be moved into position whereby one of said rolls is adapted to engage one of said flaps and the other of said rolls is adapted to engage the other of said flaps on one face thereof and press the opposite face against the glue rolls, mechanism for moving said pressure rolls, means for laterally adjusting one of said glue rolls and means for laterally adjusting the corresponding pressure roll to accommodate cartons of different thicknesses.

13. In a machine for closing and sealing the flaps of filled cartons, mechanism for moving the filled cartons successively into the several positions for operation of the closing and sealing instrumentalities, mechanism for spreading the two end flaps, mechanism for successively folding the two end flaps, mechanism for gluing the upper faces of the spread side flaps, mechanism for folding one of the glued side flaps over onto the folded end flaps, mechanism for folding the other glued side flap over onto the first folded side flap, mechanism for intermittently moving the carton carrier and means whereby the folding and gluing mechanisms are controlled by the movement of the carton carrier, and hand controlled mechanism whereby the mechanism for driving the carton carrier may be engaged and disengaged from the main driving mechanism at the will of the operator.

In testimony whereof I affix my signature, in presence of two witnesses.

WILLIAM S. SCALES.

Witnesses:
 WILLIAM A. COPELAND,
 ALICE H. MORRISON.